Dec. 24, 1968     H. R. HEARD     3,417,858
CONVEYOR APPARATUS

Filed May 16, 1967     3 Sheets-Sheet 1

INVENTOR.
HAROLD RAYMOND HEARD
BY
his ATTORNEYS

Dec. 24, 1968  H. R. HEARD  3,417,858
CONVEYOR APPARATUS
Filed May 16, 1967  3 Sheets-Sheet 2

INVENTOR.
HAROLD RAYMOND HEARD
BY
his ATTORNEYS

United States Patent Office 3,417,858
Patented Dec. 24, 1968

3,417,858
CONVEYOR APPARATUS
Harold Raymond Heard, Pittsburgh, Pa., assignor to Salem-Brosius, Inc.
Filed May 16, 1967, Ser. No. 638,777
5 Claims. (Cl. 198—110)

ABSTRACT OF THE DISCLOSURE

A conveyor apparatus having a framework of stationary beams and a plurality of sectionalized movable beams intermittently disposed within the framework of stationary beams. Each section of movable beams is independently operable so that supported material can be advanced at varying rates.

---

The walking beam conveyor is already well known. It usually consisted of a group of parallel stationary beams extending in the direction of the feed of the articles to be conveyed and a group of beams adapted to be moved in vertical paths between the stationary beams. The progression of articles upon the conveyor took place by elevating the movable beams above the plane of the stationary beams, thereby lifting the articles clear of the stationary beams. The movable beams were then moved forwardly and downwardly depositing the articles upon the stationary beams in an advanced position. The movable beams were then retracted to their original position below the plane of the stationary beams and the cycle repeated.

The conveyor described above was particularly useful in continuously operated furnaces such as those used in the heat treating of metals and ceramics. The utility of this type of conveyor was restricted, however, in that the rate of advance was constant over the entire length of travel. In heat-treating furnaces, the articles being fed onto the conveyor had to be uniform in size. Otherwise, larger articles requiring longer heating times would be insufficiently treated or smaller articles requiring shorter heating times would be over-exposed to the furnace atmosphere.

There have been various attempts to overcome this limitation. One device, disclosed in United States Patent No. 1,675,948, provides a walking beam with two sets of movable members which move in elliptical orbits having different horizontal axis lengths. By synchronously reciprocating the two sets of movable members, different rates of advance are produced for each set of movable members. However, the sets of movable members are interconnected so as to reciprocate at a given ratio to one another, and because of such interconnection, it is impossible to maintain articles on one set of movable members in a fixed position, while advancing articles on other sets.

The present invention overcomes the foregoing problems by providing a walking beam conveyor in multiple sections, each section being capable of independent operation. As adapted to heat treating furnaces, this construction permits the operator to discharge smaller articles already being processed at a faster rate thereby clearing the furnace for larger articles requiring a longer heating time. Such flexibility of operation has not been heretofore enjoyed in continuous heat-treating furnaces.

I provide a conveyor apparatus comprising a plurality of parallelly spaced stationary beams suitably supported, a plurality of movable beams parallelly disposed between the stationary beams and of lesser length than said stationary beams so that two or more movable beams must be aligned longitudinally to span the length of the stationary beams, said movable beams being aligned transversely to form sections along the longitudinal axes of the stationary beams, movable support means for the movable beams, means to selectively impart vertical reciprocating movement to each section of movable beams whereby each section of movable beams may be independently elevated above and lowered below the stationary beams, means to impart longitudinal reciprocating movement to the movable beams and means connecting the ends of the adjacent longitudinally aligned movable beams whereby the movable beams reciprocate logitudinally as a single framework and reciprocate vertically independently.

I preferably provide that the means connecting the ends of the adjacent longitudinally aligned movable beams comprises a yoke of general U-shape configuration extending from the end of one movable beam and a T-section extending from the end of the adjacent movable beam and slidably embraced within the yoke whereby the adjacent movable beams can move in the vertical plane independently of each other.

I preferably provide that the movable support means for the movable beams comprises a track mounted to the bottom of the movable beam, a roller engaging said track, a bell crank supporting the roller and pivotally attached to a base and a shaft disposed in parallel relationship to the movable beam and to which the opposite end of the bell crank is pivotally attached, whereby the movable beam is supported by the roller.

I preferably provide that the means to selectively impart vertical reciprocating movement to each section of movable beams comprises a cylinder pivotally mounted to a suitable fixed support, a piston embraced within the cylinder and pivotally attached to the shaft and a crosshead mounted transversely to and below the movable beams, said crosshead interconnecting the shafts in one section, whereby the actuation of the piston transmits vertical movement to the rollers upon which the movable beams in one section are supported.

I preferably provide that the means to impart longitudinal reciprocating movement to the movable beams comprises a cylinder pivotally mounted to a fixed support, a piston embaced within the cylinder, a crosshead mounted transversely to the movable beams and attached thereto, and a shaft interconnecting the crosshead and the piston whereby the actuation of the piston transmits longitudinal movement to the movable beams.

Other details, objects and advantages of the invention will become apparent as the following description of a presently preferred embodiment thereof proceeds.

In the accompanying drawings, I have shown a present preferred embodiment of the invention in which.

Figure 1:
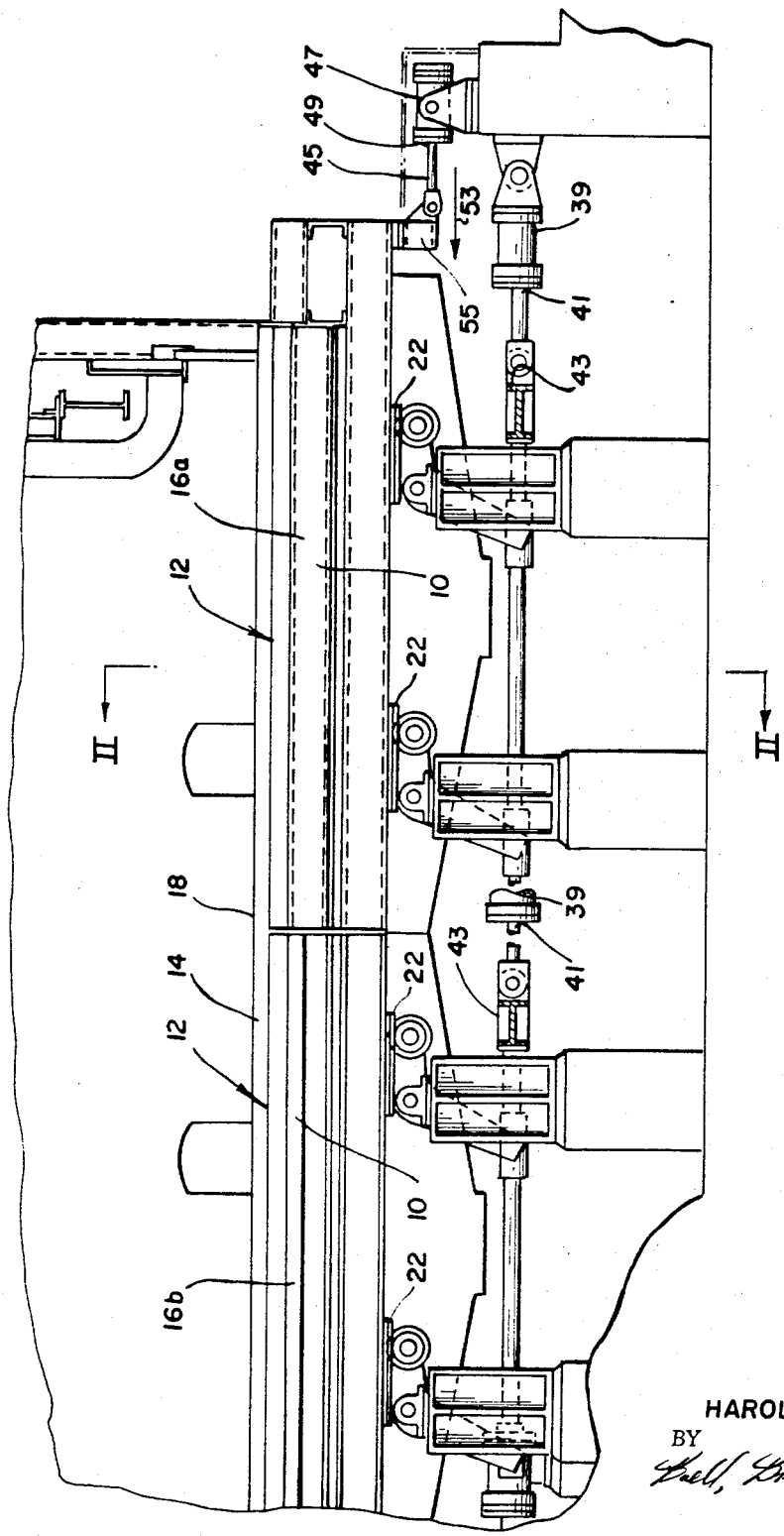
FIGURE 1 is a fragmentary sectional view along the longitudinal axis of a walking beam conveyor.
Figure 2:
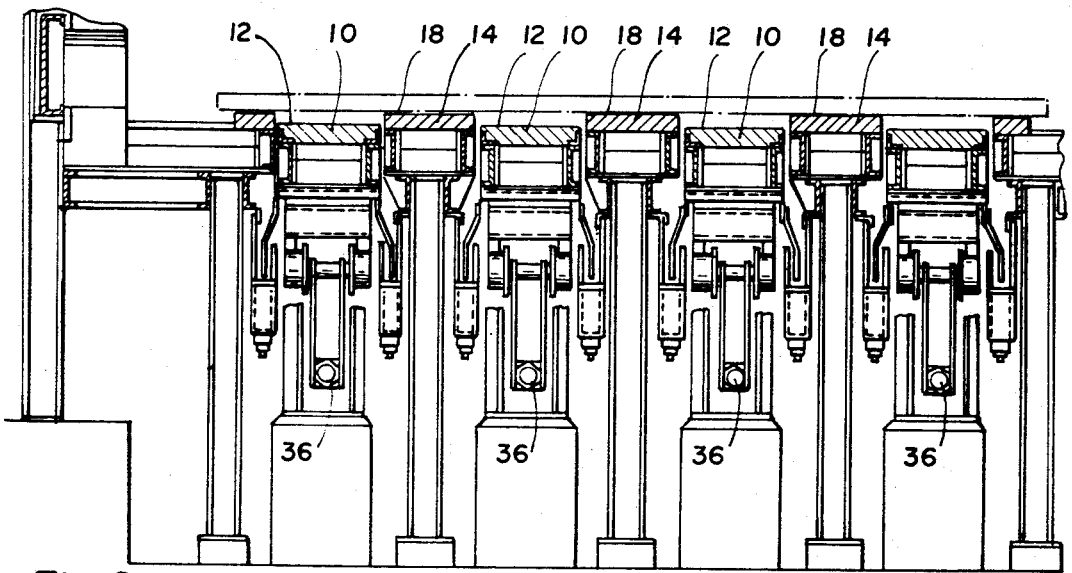
FIGURE 2 is a transverse sectional view on line II—II of FIGURE 1.

Referring specifically to the drawings, movable beams 10 are spaced between stationary beams 14 and divided into longitudinal sections designated generally as 16a and 16b. FIGURE 1 illustrates movable beams 10 in their fully lowered position. The upper surface 12 of each movable beam 10 is below the upper surfaces 18 of the stationary beams 14. In this position, the articles to be conveyed rest only upon stationary beams 14 and do not contact movable beams 10.

Figure 3:
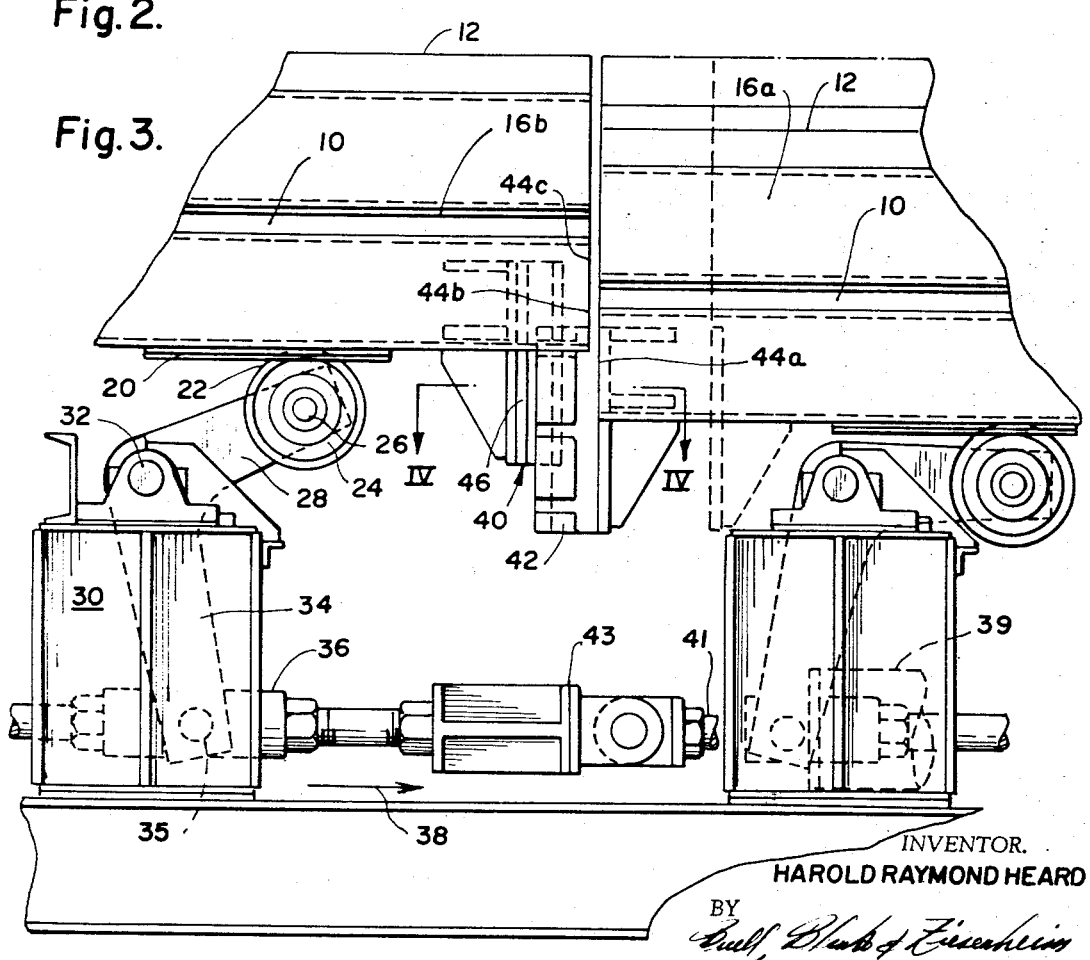
FIGURE 3 is an enlarged view of the coupling means between adjacent ends of the movable beams.

Movable support means, designated generally at 22, are provided for movable beams 10 as clearly illustrated in FIGURE 3. A track 20 is attached to the bottom of the movable beams 10. A roller 24 is attached to a bell crank 28 by a pin 26. The bell crank 28 is pivotally mounted to pillar 30 by a pin 32. The opposite end 34 of bell crank 28 is pivotally attached to shaft 36 by a pin 35. Thus, movable beam 10 is firmly supported by roller 24 through its engagement with track 20.

Vertical movement upwardly of movable beams 10 is accomplished by actuating shaft 36 in the direction of the arrow at 38 in FIGURE 3. Bell crank 28 is caused to pivot about pin 32 thereby moving roller 24 upwardly in an arc to the left. Roller 24 rolls along track 20 and causes movable beam 10 to move upwardly. When shaft 36 is actuated in the opposite direction, roller 24 reverses its movement and movable beam 10 is permitted to move downwardly. Shaft 36 is actuated by a cylinder 39 with a piston 41 therein. The operation of cylinder 39 may be controlled by any system well known in the art, for example, hydraulically or electrically. Control of the actuating system may be automatic, semi-automatic or manual according to choice.

Each of the shafts 36 in a transverse section, for example section 16a, are interconnected by a crosshead 43 as shown in FIGURE 1. By coordinating the movements of all of the shafts 36 controlling the vertical movements of the movable beams 10 in one section, a section of movable beams 10, for example section 16a, can be operated independently of the adjacent section, for example section 16b.

As shown in FIGURE 1, longitudinal reciprocation of movable beams 10 is accomplished through the movement of shaft 45 which in turn is actuated by a cylinder 47 with a piston 49 therein. Cylinder 47 is similarly controlled by means well known in the art, such control being automatic, semi-automatic or manual according to choice. Shaft 45 is pivotally attached to a crosshead 55 which extends transversely to the longitudinal axes of the movable beams and is attached to the movable beams. When shaft 45 is thrust in the direction of the arrow 53, movable beams 10 are caused to advance in that direction, rolling upon their supporting rollers 24 as hereinbefore described. When shaft 45 is actuated in the opposite direction, the movement of the movable beams 10 is reversed. The pivotal attachment of shaft 45 to crosshead permits the longitudinal movement of the movable beams 10 even when they are in the elevated position. Great simplicity of operation is attained by moving all of the movable beams 10 longitudinally as one framework. This unitary feature is achieved by utilizing the coupling means 40 described in detail below.

Figure 4:
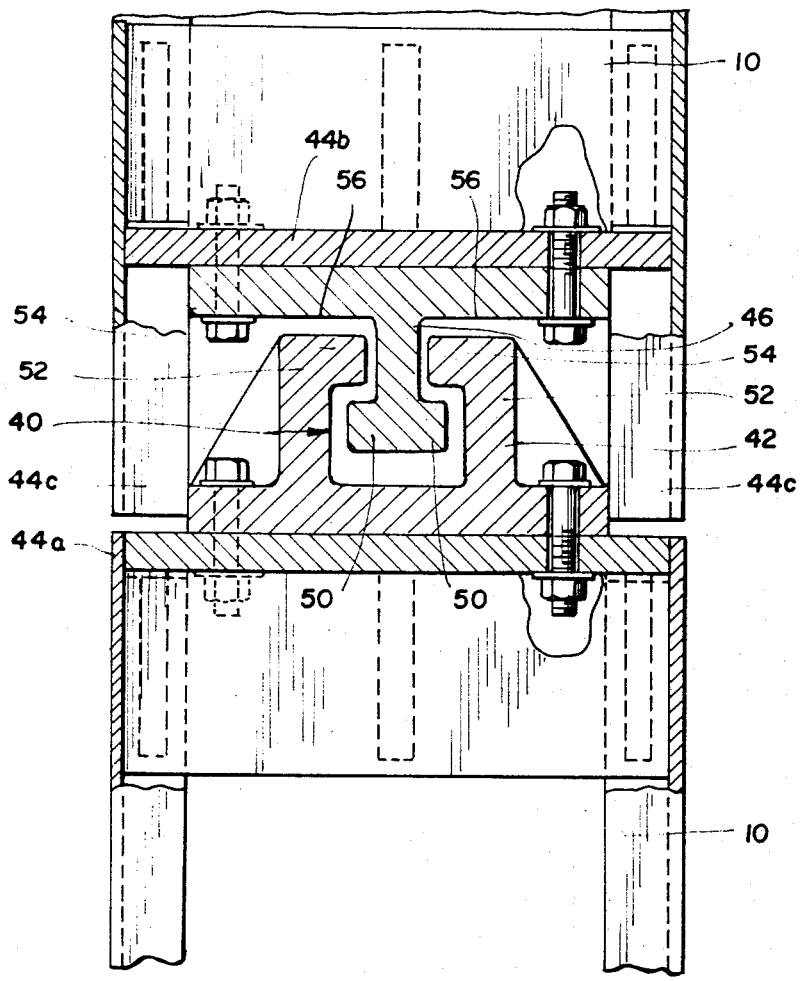
FIGURE 4 is an enlarged fragmentary sectional view of the coupling means shown in FIGURE 3 taken on the line IV—IV of FIGURE 3.

Coupling means 40 is illustrated in FIGURES 3 and 4. A yoke 42 of general U-shape configuration is bolted to the end 44a of one movable beam 10. A T-section 46 is bolted to the recessed end 44b of adjacent and aligned movable beam 10. T-section 46 is embraced loosely within the arms 52 of yoke 42 so that the adjacent and aligned movable beams 10 are free to move in the vertical plane relative to one another. When a tensile force is applied along the longitudinal axes of movable beams 10, projections 50 of T-section 46 bear upon shoulders 54 of yoke 42. When a compression force is similarly applied, the arms 52 of yoke 42 contact the base 56 of T-section 46 and the outer projections 44c of movable beams 10 contact the end 44a of adjacent and aligned movable beam 10. Both yoke 42 and T-section 46 extend sufficiently below their respective movable beams 10 so that the coupling means 40 remain engaged when movable beams 10 are at the point of maximum vertical separation.

To illustrate the flexibility of the conveyor apparatus, especially in continuous furnace applications, assume that articles of relatively small cross section have been fed onto the conveyor and are resting upon the stationary beams 14 in section 16a. The articles progress along section 16a by lifting the movable beams 10 in that section above the plane of the stationary beams 14, thereby raising the articles from their position of rest upon the stationary beams 14. Movable beams 10 are then moved longitudinally in unison in the direction of feed and lowered below the plane of the stationary beams 14. The articles are deposited in an advanced position. Movable beams 10 are retracted longitudinally to their original position without disturbing the articles resting upon the stationary beams.

As the articles progress from section 16a onto section 16b, the same rate of advance is maintained. Meanwhile, articles of relatively larger cross section can now be fed onto the conveyor at section 16a. These articles require longer heating times and hence a slower rate of advance must be maintained. The progression of the smaller articles continues upon section 16b and succeeding sections at the pre-established rate. The periodic longitudinal movement of all of the movable beams 10 which is necessary to maintain this rate does not affect the larger articles resting upon the stationary beams in section 16a. The movable beams 10 in section 16a are reciprocated longitudinally below the plane of the stationary beams in that section and therefore the articles resting thereon are not disturbed. Because of the independent operation in the vertical plane of each section of movable beams, greater utilization of time and energy can be achieved in a continuous heating furnace.

Conservation of time is similarly achieved through the use of the invention when the charging circumstances are reversed. When larger articles are being processed and it is desired to begin feeding smaller articles, the operator must simply wait until the larger articles have advanced to a point where the smaller articles can be safely charged without fear that their increased rate of advance will cause them to overtake the larger articles on the conveyor.

I claim:

1. A conveyor apparatus comprising a plurality of parallelly spaced stationary beams suitably supported, a plurality of movable beams parallelly disposed between the stationary beams and of lesser length than said stationary beams so that two or more movable beams must be aligned longitudinally to span the length of the stationary beams, said movable beams being aligned transversely to form sections along the longitudinal axes of the stationary beams, movable support means for the movable beams, means to selectively impart vertical reciprocating movement to each section of movable beams whereby each section of movable beams may be independently elevated above and lowered below the stationary beams, means to impart longitudinal reciprocating movement to the movable beams and means connecting the ends of the adjacent longitudinally aligned movable beams whereby the movable beam sections reciprocate longitudinally as a single framework, and reciprocate vertically independently.

2. A conveyor apparatus as recited in claim 1 in which the means connecting the ends of the adjacent longitudinally aligned movable beams comprises a yoke of general U-shape configuration extending from the end of one movable beam and a T-section extending from the end of the adjacent movable beam and slidably embraced within the yoke whereby the adjacent movable beams can move in the vertical plane independently of each other.

3. A conveyor apparatus as recited in claim 2 wherein the movable support means for the movable beams comprises a track mounted to the bottom of the movable beam, a roller engaging said track, a bell crank supporting the roller and pivotally attached to a base and a shaft disposed in parallel relationship to the movable beam and to which the opposite end of the bell crank is pivotally attached, whereby the movable beam is supported by the roller.

4. A conveyor apparatus as recited in claim 3 wherein the means to selectively impart vertical reciprocating movement to each section of movable beams comprises a cylinder pivotally mounted to a suitable fixed support, a piston embraced within the cylinder and pivotally attached to the shaft and a crosshead mounted transversely to and below the movable beams, said crosshead interconnecting the shafts in one section, whereby the actuation of the piston transmits vertical movement to the rollers upon which the movable beams in one section are supported.

5. A conveyor apparatus as recited in claim 4 wherein the means to impart longitudinal reciprocating movement to the movable beams comprises a cylinder pivotally mounted to a fixed support, a piston embraced within the cylinder, a crosshead mounted transversely to the movable beams and attached thereto, and a shaft interconnecting the crosshead and the piston whereby the actuation of the piston transmits longitudinal movement to the movable beams.

References Cited

UNITED STATES PATENTS

| | | | |
|---|---|---|---|
| 1,215,945 | 2/1917 | Lorrillard | 198—219 |
| 3,322,259 | 5/1967 | Milazzo | 198—219 |

EDWARD A. SROKA, *Primary Examiner.*

R. J. HICKEY, *Assistant Examiner.*

U.S. Cl. X.R.

198—219